United States Patent [19]

Ueno et al.

[11] Patent Number: 4,578,135

[45] Date of Patent: Mar. 25, 1986

[54] FUEL CELL ELECTROLYTE MATRIX AND METHOD FOR MANUFACTURING THE SAME

[75] Inventors: Mitsushi Ueno, Yokohama; Tamotsu Shirogami, Yamato; Noboru Segawa, Yokohama, all of Japan

[73] Assignee: Tokyo Shibaura Denki Kabushiki Kaisha, Kawasaki, Japan

[21] Appl. No.: 576,011

[22] Filed: Feb. 1, 1984

[30] Foreign Application Priority Data

Mar. 31, 1983 [JP] Japan ................................. 58-56002

[51] Int. Cl.$^4$ ........................ B32B 31/00; C09J 5/04
[52] U.S. Cl. ................................ 156/182; 156/276; 156/295; 156/310; 156/315; 156/319; 156/333; 429/41
[58] Field of Search ................. 429/41; 156/182, 315, 156/276, 319, 295, 333, 310; 29/623.4

Primary Examiner—John J. Gallagher
Attorney, Agent, or Firm—Oblon, Fisher, Spivak, McClelland & Maier

[57] ABSTRACT

A method for manufacturing a fuel cell electrolyte matrix comprises the steps of providing a fuel electrode and oxidizing electrode respectively coated with a catalyst layer on one side, forming a layer of powdery electrolyte-resistive material on the surface of at least one of the catalyst layers, coating a paste layer prepared from acid electrolyte and powdery electrolyte-resistive material on the powder layer or catalyst layer of the fuel electrode and/or the powder layer or catalyst layer of the oxidizing electrode, tightly superposing the fuel electrode and oxidizing electrode on each other with the paste layer and powder layer interposed therebetween, thereby forming an electrolyte matrix between both electrodes.

6 Claims, 8 Drawing Figures

FUEL CELL ELECTROLYTE MATRIX AND METHOD FOR MANUFACTURING THE SAME

BACKGROUND OF THE INVENTION

This invention relates to a fuel cell and more particularly to the electrolyte matrix of the fuel cell and a method for manufacturing the same.

A fuel cell is a device intended to generate direct current by causing an easily oxidizable gas (fuel gas) such as hydrogen and an oxidizing gas such as oxygen to electrochemically react with each other in a proper electrolyte. That type of fuel cell which is put to practical application is constructed by stacking a large number of unit cells with an interconnector set therebetween. Each unit cell comprises a pair of gas diffusion electrodes and an electrolyte matrix which holds an electrolyte such as a phosphoric acid and is interposed between said paired gas diffusion electrodes. A fuel gas supplied to the outer surface of the gas diffusion electrode and an oxidizing gas brought to the outer surface of the other gas diffusion electrode are made to react in the each electrolyte-electrode interface, thereby generating a direct current. The inside of the paired gas diffusion electrodes are generally loaded with a catalyst such as platinum in order to accelerate the above-mentioned reaction.

The performance property of the fuel cell of the above-mentioned type is often governed by the quality of the electrolyte matrix used. For the stable operation of the fuel cell, therefore, the electrolyte matrix is required to meet the following requirements;

(i) The electrolyte matrix should be stable chemically and thermally under an operating condition.

(ii) The electrolyte matrix should contain a sufficiently large amount of electrolyte, and further retain a great capacity to hold the electrolyte.

(iii) The electrolyte matrix should have a high hydrogen ion conductivity.

(iv) The electrolyte matrix should act as insulator of electrons.

(v) The electrolyte matrix should have a sufficiently high bubble pressure to suppress mutual diffusion between the fuel gas and oxidizing gas.

The conventional fuel cell generally comprises an electrolyte matrix formed of a single layer. However, such single layer type electrolyte matrix fails to fully meet the above-listed requirements, thus decreasing the reliability of the conventional fuel cell and also output voltage thereof.

The conventional single layer type electrolyte matrix is constructed by coating phosphoric acid-resistive fine powder of, for example, silicon carbide or zirconium oxide on the catalyst layer mounted on the gas diffusion electrode. To be more concrete, the conventional process of manufacturing an electrolyte matrix comprises the steps of:

mixing the proper amounts of silicon carbide, binder of fluorocarbon polymer such as polytetrafluoroethylene, water and other solvents;

applying the mixture over the surface of the catalyst layer coated on the gas diffusion substrate by means of, for example, rolling, spraying or screen printing;

drying the mixture to remove the solvent, thereby producing a matrix body; and finally impregnating the matrix body with electrolyte such as phosphoric acid.

However, the above-mentioned electrolyte matrix-manufacturing method has the drawbacks that though the application of a smaller amount of binder facilitates the impregnation of the electrolyte in the matrix body, cracks tend to appear in the matrix body when heating is applied to remove the solvent or the gas diffusion electrode is handled; and the occurrence of cracks in the matrix body results in a decline in the bubble pressure of the electrolyte, gas utilization rate and the performance of a fuel cell. Further, difficulties accompanying the conventional electrolyte matrix-manufacturing method are that though application of a larger amount of the binder can suppress the appearance of cracks in the matrix body, the hydrophobicity of the binder prevents the electrolyte from being fully carried into the matrix body, thereby decreasing the conductivity of hydrogen ions.

In view of the difficulties experienced in the conventional electrolyte matrix-manufacturing method, the present inventors proposed the method of manufacturing the electrolyte matrix which comprised the steps of mixing silicon carbide, binder and phosphoric acid in the form of paste and spreading the paste over the surface of the gas diffusion electrode. However, the above-mentioned electrolyte matrix-manufacturing method previously proposed by the present inventors which indeed proved prominently useful is still accompanied with the drawbacks that a larger content of phosphoric acid in the paste intended for improvement of the hydrogen ion conductivity of the electrolyte matrix leads to a rise in the fluidity of the paste. This increased paste fluidity is accompanied with further problems that when a unit cell is constructed by compressing a pair of gas diffusion electrodes with the paste interposed therebetween or after this step, the paste leaks crosswise from the unit cell. Such objectionable event results in the difficulties that the electrolyte matrix is reduced in thickness; the bubble pressure of the electrolyte decreases; and partial short-circuiting takes place between the paired gas diffusion electrodes. After all, previous method of manufacturing an electrolyte matrix from the above-mentioned paste was still accompanied with the drawback that the fuel cell eventually decreased in performance.

SUMMARY OF THE INVENTION

It is accordingly an object of this invention to provide a fuel cell electrolyte matrix, which allows for the impregnation of a large amount of electrolyte without reducing the bubble pressure thereof and preserves the high conductivity of hydrogen ions, thereby assuring the high performance of the resultant fuel cell.

Another object of the invention is to provide a simple and practicable method of manufacturing said electrolyte matrix. To attain the above-mentioned objects, this invention provides the method of manufacturing an electrolyte matrix for a fuel cell, which comprises the steps of providing a fuel electrode and oxidizing electrode, each of which is coated with a catalyst layer on one side, forming a layer of powdery electrolyte-resistive material on at least one of the catalyst layers, applying a paste prepared from a mixture of acid electrolyte and powdery electrolyte-resistive material to the powder layer or catalyst layer of the fuel electrode and/or on the powder layer or catalyst layer of the oxidizing electrode, and tightly superposing the fuel electrode and oxidizing electrode with the paste layer and powder layer interposed therebetween, thereby producing an electrolyte matrix between the electrodes.

The electrolyte used in this invention includes phosphoric acid or a polymer, for example, a dimer or tetramer of trifluoromethane sulfonic acid.

The powdery electrolyte-resistive materials used in this invention include silicon carbide, tungsten carbide, silicon nitride, zirconium oxide, tantalum pentoxide, zirconium phosphate and silicon phosphate and a mixture of two or more of the above-listed materials. The above-mentioned powders are chosen to have a particle size of 0.5 to 5 microns. The powders need not be limited to the particulate type, but may be of the fibrous type, or be formed of both particulate and fibrous types. It is possible to form the powder layer on the catalyst layer spread on the fuel electrode as well as on the catalyst layer coated on the oxidizing electrode or on either of these catalyst layers. The powder layer can be formed by coating the above-mentioned catalyst layer with a paste composition prepared from 100 parts by weight of powder, 3 to 10 parts by weight of binder and 50 to 200 parts by weight of solvent, drying the paste composition in the open air at a temperature of 80° to 150° C. for 1 to 3 hours, subjecting the dried paste composition to heat treatment in a non-oxidizing atmosphere at a temperature of 240° to 320° C. for 15 to 60 hours. The binder includes a fluorocarbon polymer such as polytetrafluoroethylene and fluoroethylene-propylene copolymer. The solvent includes water, polyethylene glycol and carboxymethyl cellulose.

Like the powder layer, the paste layer can be spread on the catalyst layer or powder layer of the fuel electrode and the catalyst layer or powder layer of the oxidizing electrode, or on either of there layers. The paste layer may contain a binder as in the aforementioned case. In such case the paste is formed of 100 parts by weight of powder, 80 to 250 parts by weight of electrolyte and 2 to 30 parts by weight of binder.

An electrolyte matrix formed by the aforementioned process between the fuel electrode and oxidizing electrode comprises:
 a first layer formed of tightly connected particles of electrolyte-resistive material and electrolyte filled in the spaces defined between said particles; and
 a second layer which is set adjacent to said first layer and formed of loosely connected particles of electrolyte-resistive material and electrolyte filled in the spaces defined between said particles.

The electrolyte contained in the first layer was originally squeezed out of the paste layer in a large amount. The amount of said electrolyte per unit weight of particles is generally 2 to 3 times larger, than those of the electrolyte contained in the second layer.

When a powder layer is formed by the aforementioned process in the surface of the catalyst layer of the fuel electrode and that of the catalyst layer of the oxidizing electrode, the resultant electrolyte matrix is formed of three layers, that is, the two first layers and one intervening second layer. When the powder layer is formed on the surface of one of said catalyst layers, then the resultant electrolyte matrix is formed of two layers, that is, first and second layers.

The electrolyte matrix of this invention has the advantages that even when the powder layer previously coated on the surface of the catalyst layer of the electrode is cracked while it is dried or handled, the cracks are fully filled with the subsequently coated paste to provide a perfect electrolyte matrix, thereby eliminating the possibility of the bubble pressure being reduced; the powder layer contains an acid electrolyte and is free from fluidity, and consequently can be formed precisely with a prescribed thickness; as a result, the fuel electrode and oxidizing electrode are spaced from each other at a desired distance; and the electrolyte matrix is effectively prevented from being excessively thinned, thereby suppressing a decline in the bubble pressure and consequently the occurrence of local short-circuiting between both fuel electrode and oxidizing electrode. Therefore, the electrolyte matrix of the invention makes a great contribution to the improvement of the performance of a fuel cell.

DETAILED DESCRIPTION OF THE PREFERRED EMBODIMENT

Figure 1:
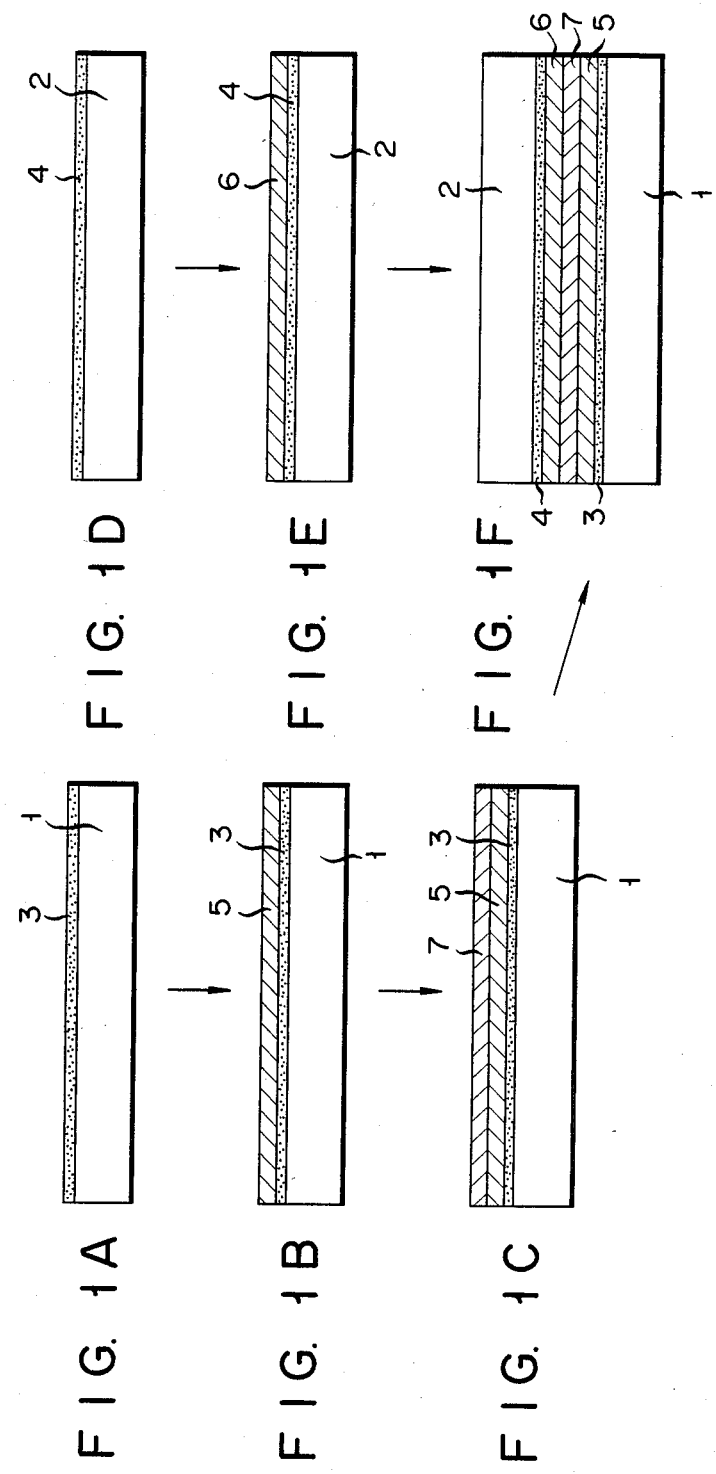
FIGS. 1A to 1F are sectional views showing the successive steps of an electrolyte matrix-manufacturing method embodying this invention.

Description may now be given with reference to the accompanying drawings of an electrolyte matrix-manufacturing method embodying this invention. FIGS. 1A to 1F are sectional views showing the sequential steps of said electrolyte matrix-manufacturing method. As shown in FIGS. 1A to 1D, there were first provided a fuel electrode 1 coated with, for example, a platinum catalyst layer 3 and an oxidizing electrode 2 similarly coated with, for example, a platinum catalyst layer 4. A paste composition prepared by mixing 100 parts by weight of silicon carbide powder having a smaller size than 10 microns, 5 parts by weight of polytetrafluoroethylene as a binder and a proper amount of water was coated on the surface of a catalyst layer 3 deposited on the fuel electrode 1 and another catalyst layer 4 spead on the oxidizing electrode 2 by means of, for example, the doctor blade method. The whole mass was preliminarily dried at 100° C. for 2 hours, and later subjected to heat treatment at 250° C. for about 30 minutes in a non-oxidizing atmosphere of, for example, nitrogen gas or argon gas. As shown in FIGS. 1B and 1E, silicon carbide layers 5, 6 were respectively formed on the catalyst layers 3, 4 with a thickness of 0.1 mm. The silicon carbide layers 5, 6 thus formed were accompanied by cracks extending from the surface to the interior.

A paste composition prepared by mixing 100 parts by weight of silicon carbide powder having a smaller size than 10 microns, 130 parts by weight of 100% phosphoric acid and 3 parts by weight of polytetrafluoroethylene was coated with a thickness of 0.2 mm on, for example, the silicon carbide layer 5 mounted on the fuel electrode 1 (FIG. 1C). Later, a silicon carbide layer 6 partly constituting the oxidizing electrode 2 was superposed in a previously deposited paste layer 7 (FIG. 1F). Pressure was applied to both sides of the laminated mass to provide a unit cell consisting of the integrally assembled fuel electrode 1 and oxidizing electrode 2. Thus, an electrolyte matrix body impregnated with an electrolyte of phosphoric acid was formed between the fuel electrode 1 and oxidizing electrode.

Figure 2:
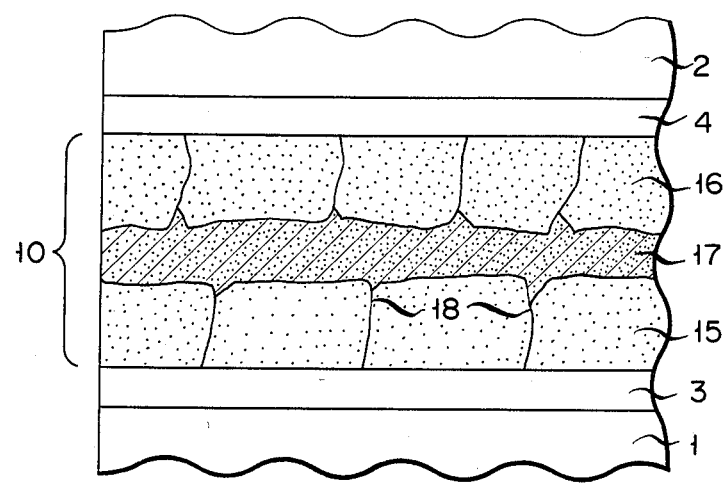
FIG. 2 is a fractional sectional view of an electrolyte matrix produced by the steps shown in FIGS. 1A to 1F.

FIG. 2 is an enlarged cross sectional view of the electrolyte matrix thus prepared. An electrolyte matrix 10 formed between the catalyst layer 3 of the fuel electrode 1 and the catalyst layer 4 of the oxidizing electrode 2 consists of a pair of first layers 15, 16 and an intervening layer 17. The first layers 15, 16 correspond to the silicon carbide layers 5, 6 of FIG. 1F, and the second layer 17 corresponds to the paste layer 7 of FIG. 1F. FIG. 1F shows the condition of the laminated mass before it is tightened. Therefore, the silicon carbide layers 5, 6 are not yet impregnated with a large amount of electrolyte. When the mass of FIG. 1F is vertically squeezed, the electrolyte contained in the paste layer 7 is forcefully brought into the silicon carbide layers 5, 6 without leaking sidewise. As a result, the first layers 15, 16 of FIG. 2 are impregnated with a large amount of electrolyte. With the paste layer 7 from which the electrolyte was extracted, the silicon carbide particles are carried toward the center of the laminated mass, causing said paste layer 7 to be changed into a second layer 17 having a thickness half the original level, that is 0.1 mm. Now, therefore, said second layer 17 is impregnated with a smaller amount of electrolyte than the first layers 15, 16. The particles of the silicon carbide layers 5, 6 are tightly connected together by binder and thus prevented from making a relative motion. Even after being squeezed, therefore, the silicon carbide layers 5, 6 show little change in thickness. Therefore, said silicon carbide layers 5, 6 are turned into first layers 15, 16 in which a large amount of electrolyte is held in the cells formed among the particles. An amount of electrolyte held per unit weight of silicon carbide contained in the first layers 15, 16 was shown to be 1.5 times that which was retained in the second layer 17.

As previously described, a large number of cracks 18 appeared in the first layers 15, 16. However, said cracks were filled with the paste extracted from the paste layer 7 by squeezing. Consequently, the electrolyte matrix was saved from a decline in bubble pressure which might otherwise occur due to the presence of said cracks.

For evaluation of an electrolyte matrix embodying this invention, the undermentioned unit cells were manufactured as controls. Control A was prepared by the steps of directly impregnating the silicon carbide layers 5, 6 of FIGS. 1B and 1E with 100% phosphoric acid, superposing electrodes 1, 2 on each other and tightening them together to provide a unit cell. Control B was manufactured by the steps of tightening together the catalyst layers 3, 4 of the electrodes 1, 2 with the paste layer 7 interposed therebetween, without forming the silicon carbide layers 5, 6. Measurement was made of the bubble pressure of an electrolyte matrix and examinations were made if a squeeze-out of the electrolyte and semi-short circuiting of the unit cell occur with respect to the unit cells represented by Controls A, B and a unit cell embodying this invention. The results are given in Table 1 below.

TABLE 1

|  | Bubble pressure ($kg/cm^2$) | Squeeze-out of electrolyte | Semi-short circuiting |
|---|---|---|---|
| Example | 0.5 to 1.2 | Small | None |
| Control A | 0.05 to 0.2 | Practically none | None |
| Control B | 0.01 to 0.4 | Large | Slightly |

TABLE 1-continued

|  | Bubble pressure ($kg/cm^2$) | Squeeze-out of electrolyte | Semi-short circuiting |
|---|---|---|---|
|  |  |  | noticeable |

As seen from Table 1 above, a unit cell provided with an electrolyte matrix embodying this invention is far more excellent than the unit cells represented by Controls A, B.

Three different fuel cells representing the present invention and Controls A, B were respectively assembled from a grapn of 10 stacked unit cells (each measuring $20 \times 20$ cm$^2$) by interposing therebetween an interconnector provided with a gas passage groove on both sides. It was determined that changes with time in the output voltage of these three fuel cells at an operating temperature of 200° C. The results are set forth in the curve diagram of FIG. 3. Curve a denotes changes with time in the output voltage of a fuel cell embodying this invention; curve b shows similar data observed in Control A; and curve c indicates similar data obtained from Control B. Data given in FIG. 3 were obtained by conducting determination under the condition in which hydrogen gas was used as a fuel gas, air was applied as an oxidizing gas, and the current density was set at 200 mA/cm$^2$. The determination made with respect to the fuel cell represented by Control A indicated noticeable variations. Nontheless, the results of said determination may be approximately expressed as curve b.

Figure 3:
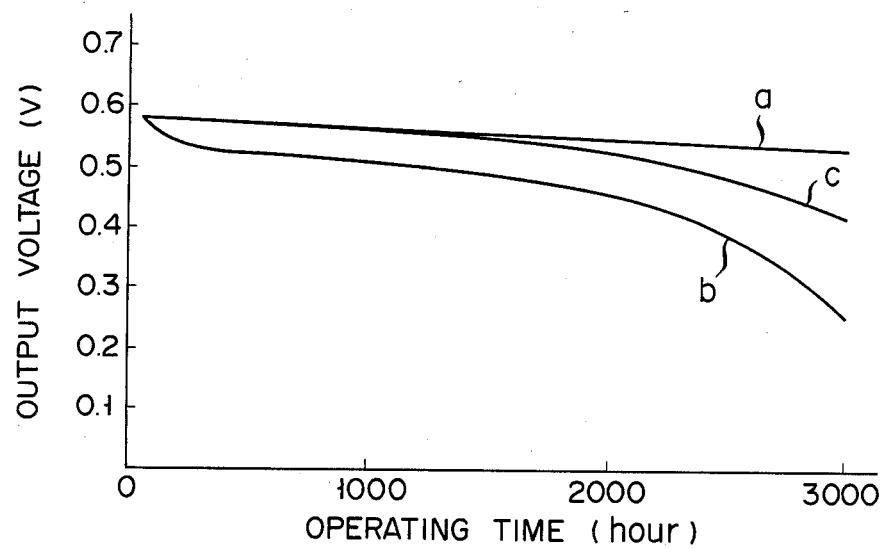
FIG. 3 is a graph comparing the output performance of a fuel cell provided with an electrolyte matrix embodying this invention and that provided with the conventional electrolyte matrix.

FIG. 3 proves that the fuel cell embodying this invention generates very stable output voltage over a long period of operation. In contrast, the fuel cell represented by Control A has the drawback that the low bubble pressure of the electrolyte matrix leads to an unstable output voltage. The fuel cell denoted by Control B is also accompanied by difficulties that though showing substantially as stable an output voltage on this invention during an operation period of about 1000 hours, the fuel cell of Control B shows a gradual decline in the output voltage when operated longer than 1000 hours. This undesirable event is supposed to arise from the fact that the squeeze-out of the paste results in a decrease in the amount of electrolyte prepared from phosphoric acid; the phosphoric acid is entrained by the effluent gas; and the water content of the phosphoric acid is undesirably evaporated.

As clearly inferred from the result of the above-mentioned determination, the electrolyte matrix-manufacturing method of this invention is prominently adapted to provide an excellent fuel cell by a simple process with great ease, thereby offering a great industrial advantage.

What is claimed is:

1. A method for manufacturing a fuel cell electrolyte matrix which comprises the steps of:
   providing a fuel electrode and oxidizing electrode respectively coated with a catalyst layer on one side;
   forming a powder layer prepared from electrolyte-resistive material on the surface of at least one of said catalyst layers;
   spreading a paste layer prepared from a mixture of acid electrolyte and powdery electrolyte-resistive material on the powder layer or catalyst layer coated on the fuel electrode and/or the powder layer or catalyst layer coated on the oxidizing electrode;

tightly superposing the fuel electrode and oxidizing electrode with the paste layer and powder layer interposed therebetween, thereby forming an electrolyte matrix between both electrodes.

2. The method according to claim 1, wherein the electrolyte is formed of phosphoric acid or a polymer of trifluoromethane sulfonic acid; and the electrolyte-resistive material is at least one selected from the group consisting of silicon carbide, tungsten carbide, silicon nitride, zirconium oxide, tantalum pentoxide, zirconium phosphate and silicon phosphate.

3. The method according to claim 1, wherein the powder layer is formed by the steps of coating a composition consisting of electrolyte-resistive material, binder therefor and solvent of said binder on the surface of at least one of said catalyst layers, and then carrying out the heat-treatment of the whole mass.

4. The method according to claim 3, wherein the binder is the fluorocarbon polymer, and the solvent is water.

5. The method according to claim 1, wherein the paste contains the binder.

6. The method according to claim 5, wherein the binder is the fluorocarbon polymer.

* * * * *